June 23, 1925.
D. G. URQUHART
1,542,923
PHOTOGRAPHIC PRINTING APPARATUS
Filed Nov. 15, 1920
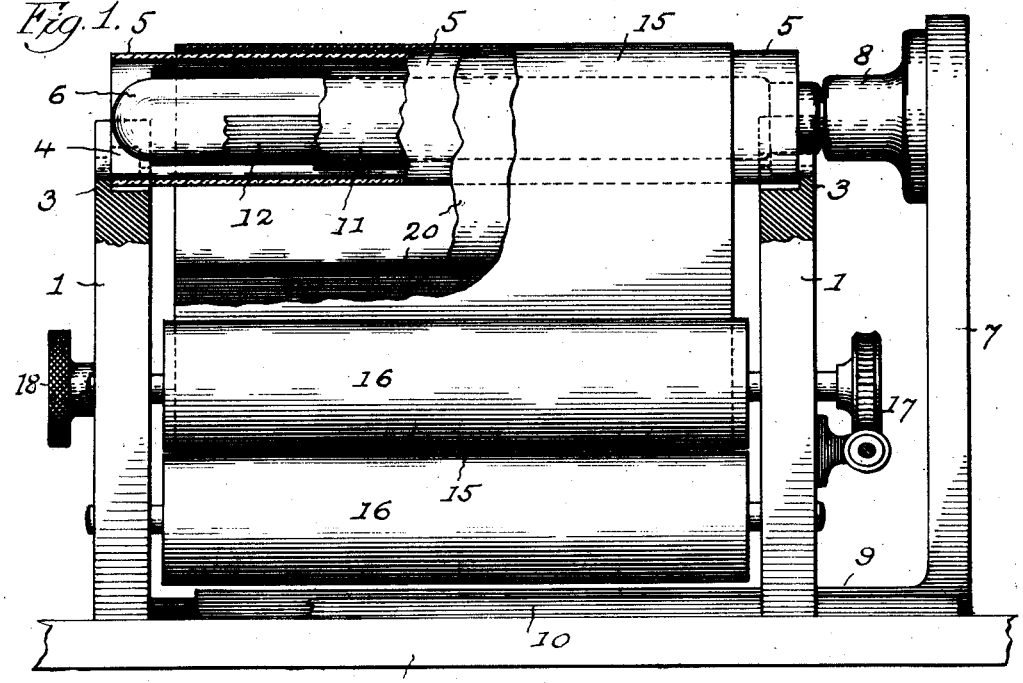
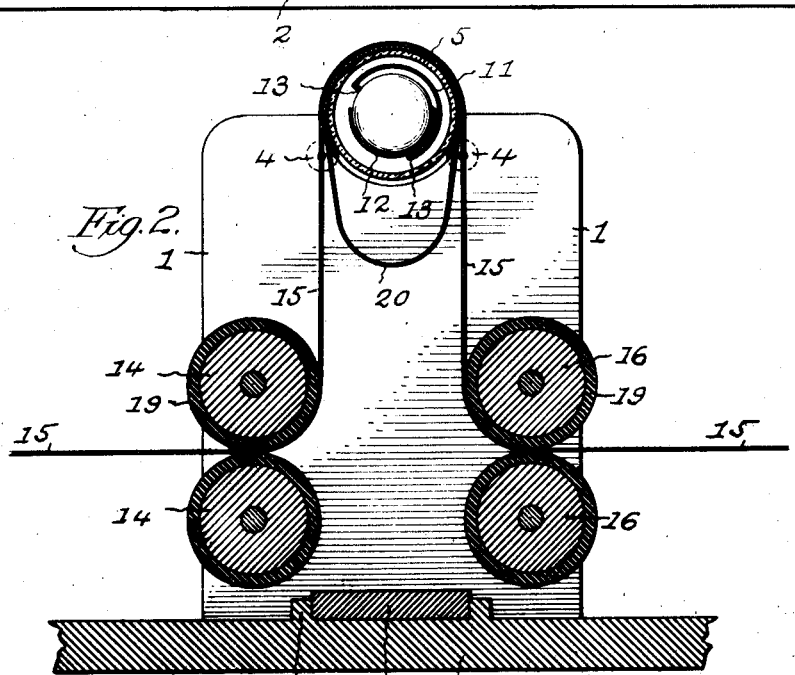
Witness:
John Enders
Inventor:
David G. Urquhart,
by Robert Burns
Atty Patented June 23, 1925.

1,542,923

UNITED STATES PATENT OFFICE.

DAVID G. URQUHART, OF CHICAGO, ILLINOIS, ASSIGNOR TO PHOTO SALES SERVICE CORPORATION, OF CHICAGO, ILLINOIS, A CORPORATION OF ILLINOIS.

PHOTOGRAPHIC-PRINTING APPARATUS.

Application filed November 15, 1920. Serial No. 424,229.

*To all whom it may concern:*

Be it known that I, DAVID G. URQUHART, a citizen of the United States of America, and a resident of Chicago, in the county of Cook, State of Illinois, have invented certain new and useful Improvements in Photographic-Printing Apparatus, of which the following is a specification.

This invention relates to that class of photographic printing apparatus designed for the production of a plurality of prints or reproductions mechanically and automatically from a given negative or printing medium.

The general object of the invention is the provision of mechanism of the type specified which attains the utmost simplicity in construction and operation, and yet which is sufficiently versatile and adaptable to meet practical requirements involved in the production of photographs commercially in quantities.

Another object of the invention is the provision of a simple and efficient structural formation and association of parts whereby a negative or plurality of negatives united into an endless web is supported in cooperative relation with a sensitive web, and continuously fed past an exposure aperture or light passage whereat the sensitized material is subjected to light exposure through the negative or printing medium.

A specific object of the invention is the provision of a simple and efficient structural formation and arrangement of shutter parts, whereby the light passage or exposure aperture of the apparatus can be adjusted as required to vary the time of exposure or the extent thereof.

A particular object of the invention is the provision of a machine of the sort specified in which accurate register of the film and negative is assured throughout the period of exposure and incident to a transmittal of said parts past the exposure aperture.

Another object is the provision of a machine of the sort specified which is designed to secure close and smooth contact between the sensitized sheet and the negative throughout the exposure area while those elements are being fed or transmitted at very high speed.

A very important object of the invention is the provision of a machine which will accommodate great variation in length of the film or negative, without requiring variation in the speed or setting of the machine or requiring any interchange or substitution of parts.

Another object of the invention is the provision of a machine which can be operated rapidly and continuously to produce a number of reproductions or prints from a given negative without waste of the sensitized paper or material upon which the reproductions are made.

Other and further objects of the invention will be pointed out hereinafter, indicated in the appended claims, or obvious to one skilled in the art upon a full understanding of the invention from the present disclosure.

In the accompanying drawing forming a part of this specification I have shown one form in which the invention may be embodied, but it is to be understood that the same is presented here for illustrative purpose merely, and that it is not to be given the force or effect of limiting what I claim short of the true and most comprehensive scope of the invention in the art.

Fig. 1 is a side elevation with parts broken away and in section of the preferred form of the apparatus.

Fig. 2 is a longitudinal section of the same.

Like reference numerals indicate like parts in both views.

Described generally, my invention contemplates the provision of a film supporting member, which may be embodied in the form of a cylinder of transparent material, which film supporting member is disposed in operative association with a luminant so that light from the latter will be rendered effective through the supporting member upon a sheet of sensitized material which is transmitted past the latter. The effective area of the luminant is controlled by means of an adjustable diaphragm arrangement, whereby the period of exposure incident to the transmittal of the sensitized sheet may be varied. The area of the film supporting member is such that a negative or printing medium in the form of a loop or endless belt of flexible material may be arranged about it and find support with a portion of its length in surface contact with the supporting member over the exposure area. Suitable mechanism is provided for transmitting the sheet or web of sensitized material past the film supporting member, and also for tensioning the sheet of sensitized material against the negative or film strip to press the latter upon the film supporting member over the exposure area, thereby securing accurate register and close contact between the negative and sensitized sheet throughout the exposure period. The tensioning and transmitting operation effected upon the sensitized material constitutes also the driving or actuating power whereby the negative is moved past the printing area, and the film supporting member, if movable, is rotated to accommodate the progressive movement of the negative and the sensitized material. The invention will be understood more in detail by reference to the particular embodiment in the drawing, from which it will be understood that the numeral 1 designates a pair of vertical standards secured in spaced relation to a base or bottom plate 2, to constitute the main frame or housing of the apparatus. In the preferred construction shown the upper ends of the standards 1 are formed with open top sockets or recesses for support of the transparent film supporting member 5 which is a rigid member formed to permit passage of light through a part thereof, and which may be conveniently formed as a glass cylinder, and which cylinder is held from end movement in said sockets by end flanges 3 at the remote ends of the sockets as shown in Fig. 1.

The numeral 4 designates bearing rollers associated with the aforesaid sockets, and adapted to provide bearings upon which the said cylinder is free to rotate, while 5 designates the film supporting cylinder of the apparatus which is made of light transmitting material and is open at its respective ends, and supported in a readily removable manner in the aforesaid sockets and upon the bearing rollers 4 aforesaid. The numeral 6 designates the light source of the apparatus, preferably a cylindrical electric lamp of a length corresponding with that of the transparent cylinder 5 and arranged within the same in a removable manner. This lamp is sustained by a lamp supporting standard 7 provided at its upper end with a holding socket for the lamp 6 and having at its lower end a horizontal slide bar 9 moving in suitable guides 10 on the base plate 2 of the apparatus.

In the described construction the lamp 6 is adapted for ready removal in a longitudinal direction from its normal position within the transparent cylinder 5 for the purposes of lamp replacement, threading the webs in place and adjusting the light shutter members. The numerals 11 and 12 designate companion resilient shutter members of a semi-cylindrical form, adapted to be sprung upon and held by their resiliency upon the periphery of the cylindrical bulb of the lamp 6, to constitute a diaphragm housing the same and in a manner permitting a circumferential adjustment of the outer shutter member 11 upon the inner shutter member 12 to vary the peripheral extent of the light aperture between adjacent edges of the members as illustrated in Fig. 2.

Inturned flanges 13 are formed on the outer shutter member 11, having bearing respectively upon the periphery of the companion member 12 and of the transparent cylinder 5, and adapted to reduce frictional resistance of the parts in an aperture adjustment of the same.

The driving mechanism includes a pair of tension drums 14 journalled in the standards 1, in a plane below the transparent cylinder 5, and adapted to engage the sensitized web 15 used in the apparatus and tension it incident to its longitudinal transmission through the machine. Associated with the tension drums is a pair of feed drums 16 journalled in the standards 1, in a plane below the transparent cylinder 5, and adapted to feed the sensitized web 15 through the apparatus, and to such purpose the carrying shaft of one of said drums 16 will be operatively connected to a suitable power source by a worm gearing 17 or other like driving connection.

A hand wheel 18 is mounted on the shaft of one of the tension drums 14 for effecting an initial tensioning of the sensitized web 15.

The tension and feeding drums 14 and 16 above described are preferably provided with a covering 19 of rubber or like elastic material whereby they may effectively engage the web of sensitized material at points where it is out of contact with the film strip.

The numeral 20 designates the negative web or film strip which in the contemplation of the present invention consists of an exposure or printing medium which may comprise either a single large negative or picture or a plurality of smaller negatives or pictures attached together in the form of an endless web, and adapted to be threaded upon the transparent cylinder 5 so as to occupy a position between it and the sensitized web 15 as shown in Fig. 2, and to be susceptible of travel or progressive movement around the cylinder during a continued operation of the apparatus in the printing of a more or less extended edition of the single picture or multiple of pictures comprising the endless web.

In practical use the endless negative web 20 will be disposed to encircle the film supporting member 5 and the sensitized web 15 will be threaded through the apparatus between the rollers 16 and the rollers 14 and across the film supporting member in contact with a portion of the film strip thereon, in the manner illustrated in Fig. 2, the removable and replaceable nature of the transparent cylinder 5 admitting of a ready and convenient attainment of such operation. By a proper adjustment of the rollers 14 and incident to the longitudinal traction exerted upon the web by the rollers 16, the portion of the web between the feeding and tensioning rollers will be tensioned against the film strip where it is supported by the film supporting member 5, and which area is in front of the light emitting aperture of the diaphragm. This tension exerted through the instrumentality of the web 15, together with the progressive movement of the web, will be effective to transmit the film strip across the exposure area in front of the light emitting aperture, the freely rotatable cylinder 5 accommodating such movement by rotation on its bearings, so that no frictional resistance is offered to the progressive movement of the film strip or of the web. Thereby, not only is very close and smooth contact of the web and film strip at the exposure point attained, but continual accurate register of the web and strip is maintained throughout their passage across the exposure area. During such passage the light is effective through the film supporting member and the negative or film strip and upon the sensitized web in the exposure area. The progressive transmittal of the film strip about the film supporting member brings the several portions of the strip repeatedly into register with portions of the web in the exposure area, so that repeated reproductions or prints are made through the film strips upon different portions of the web. After the web has left the film strip and passed through the feed rollers 16, it may be led to developing apparatus or to other point of disposal.

From the foregoing it will be seen that my invention may be embodied in apparatus of the utmost simplicity. By the utilization of the sensitized web as the driving instrumentality I am enabled to eliminate separate driving means for transmitting the film strip and the cylinder, and thereby remove the possibility of drag between the film strip and the web such as frequently throws these elements out of register where they are transmitted through different instrumentalities. By this construction I am enabled also to eliminate all gripping or pressing expedients heretofore resorted to for compressing the sensitized web upon the negative or the negative upon the supporting member, and I thereby eliminate wear upon the negative and avoid wrinkling or drawing of the web or film strip. The arrangement also permits a given machine to utilize a film strip of any practical length without the production of waste or blank spaces between the successive prints on the web. The machine, once started, is adapted for continuous and rapid operation entirely automatically, and is therefore particularly adapted for the production of photographic prints of uniform exposure in large quantities and at low cost. The machine is particularly adapted for automatic operation in conjunction with mechanism for performing the developing and fixing operations upon the exposed web, as it is adapted for operation at all times at uniform speed, irrespective of the period of exposure required for the particular reproduction, as the exposure period is determined by the extent of the exposure aperture of the diaphragm.

Having thus fully described my said invention what I claim as new and desire to secure by Letters Patent is:—

1. In a photographic printing apparatus the combination of a frame, a transparent cylinder rotatably supported on said frame and disengageable therefrom, an endless film strip of flexible material movably engaging said cylinder and movable off of and onto the same when it is disengaged from the frame, a luminant within the cylinder, and means for transmitting a web of flexible sensitized material across the cylinder in register with the film strip of flexible material.

2. In a photographic printing apparatus the combination of a frame, a cylinder of light transmitting material disengageably supported for rotation on said frame, a photographic negative in the form of an endless flexible belt movably engaging said cylinder in encircling relationship thereto and removable over an end thereof when the same is disengaged from the frame, a luminant supported within the cylinder, a diaphragm cooperating therewith to vary its effectiveness upon the cylinder, and means for transmitting a web of sensitized material past the cylinder in contact with the negative.

3. In a photographic printing apparatus, the combination of a frame, a transparent printing cylinder supported on said frame and having an open end, an electric lamp arranged in the interior of said cylinder in an endwise removable manner, a diaphragm comprising a pair of semi-circular plate sections surrounding the enclosing casing of said lamp and provided with inturned flanges having bearing upon the casing, and means for feeding an inner negative web and an outer sensitized web around said cylinder.

4. In a photographic printing apparatus, the combination of a supporting frame having a pair of standards arranged in spaced relation and formed with open top bearing recesses, a transparent cylinder open at one end and supported in a removable manner in said recesses, an electric lamp adapted for endwise insertion through the open end of said cylinder, a carriage for said lamp having movement in the supporting frame in a plane parallel with the axis of said cylinder, a diaphragm associated with said lamp and supported for movement therewith, and means for feeding a negative web and a sensitized web around said cylinder.

5. In a photographic printing apparatus, the combination of a supporting frame having a pair of standards arranged in spaced relation and formed with open top bearing recesses, a transparent cylinder open at one end and supported in a removable manner in said recesses, an electric lamp adapted for endwise insertion through the open end of said cylinder, a carriage for said lamp having movement in the supporting frame in a plane parallel with the axis of said cylinder, a shutter comprising a pair of semi-circular plate sections fitting the enclosing casing of said lamp and supported thereby, and means for feeding a negative and a sensitized web around said cylinder.

6. In a photographic printing apparatus, the combination of a supporting frame having a pair of standards arranged in spaced relation and formed with open top bearing recesses, a transparent cylinder open at one end and supported in a removable manner in said recesses, an electric lamp adapted for endwise insertion through the open end of said cylinder, a carriage for said lamp having movement in the supporting frame in a plane parallel with the axis of said cylinder, a shutter comprising a pair of semi-circular plate sections surrounding the enclosing casing of said lamp and provided with inturned flanges having bearing upon said casing, and means for feeding a negative web and a sensitized web around said cylinder.

7. In a photographic printing apparatus, the combination of a supporting frame having a pair of standards arranged in spaced relation and formed with open top bearing recesses and with stop flanges at the remote ends of said recesses, a transparent cylinder open at one end and supported in a removable manner in said recesses, an electric lamp adapted for endwise insertion through the open end of said cylinder, a carriage for said lamp having sliding movement in the supporting frame in a plane parallel with the axis of said cylinder, a shutter encircling said lamp and supported thereon, and means for feeding a negative web and sensitized web around said cylinder.

8. A photographic printing apparatus comprising the combination of a cylinder of light transmitting material mounted for rotary movement, a lighting element supported within said cylinder, a flexible film strip engaging said cylinder for progressive movement onto and off of the same incident to rotation thereof, a web of flexible sensitized material overlying said film strip where it is in engagement with the cylinder, and means for tensioning the web longitudinally and transmitting it to rotate the cylinder and transmit the film strip.

9. In a photographic printing apparatus the combination of a cylinder of light transmitting material mounted for rotation, a lighting element supported within the cylinder, an endless flexible film strip maintained on the cylinder for movement into and out of contact therewith incident to rotary movement thereof, a flexible sensitized web overlying said film strip, transmitting means effective through instrumentality of the web to transmit the same and the film strip, and tensioning means effective upon the web and cooperating with the transmitting means to press the web and film strip upon the cylinder.

10. In a machine of the class described, the combination of a rotatable film supporting member adapted to permit passage of light, a flexible film strip freely retained upon the supporting member and adapted to be moved progressively into contact therewith as the supporting member is rotated, a flexible web of sensitized material overlying a portion of the film strip in contact with the supporting member, feeding means engaging a portion of the web out of contact with the film and effective to tension the web longitudinally across the supporting member, and to transmit the web and the film strip progressively past the supporting member, and a luminant arranged to direct light upon the film strip through the supporting member.

11. In a machine of the class described, the combination of a rotatably mounted cylinder of light transmitting material, a luminant supported therein, a diaphragm member enclosing the luminant and affording an exposure aperture, a film strip of flexible material movable about the cylinder and having surface contact therewith, a flexible web of sensitized material overlying the film strip, and means for exerting longitudinal tension upon the web to press the web and film strip upon the cylinder and to transmit the web and film strip past the exposure aperture.

12. In an apparatus of the class described, the combination of a cylinder of light transmitting material, a film strip supported thereon and movable thereabout, a luminant supported within the cylinder, a diaphragm member for determining the area of effectiveness of said luminant, a flexible web of sensitized material overlying the film strip, and transmitting means engaging a portion of the web out of contact with the cylinder, said transmitting means being effective to induce longitudinal tension in the web to press the film upon the cylinder and to transmit the film strip thereabout.

13. In a machine of the class described, the combination of end frame members, a cylinder of light transmitting material rotatably supported thereon, a photographic negative in the form of a loop of flexible material encircling the cylinder and supported thereon, said cylinder being removable from an end frame member to permit the placing and removal of said negative, a flexible web of sentitized material overlying a portion of the negative in contact with the cylinder, means for transmitting the web to move the negative about the cylinder, and a luminant disposed within the cylinder for cooperation with the negative and web.

14. In an apparatus of the class described the combination of a rotatably mounted cylinder of light transmitting material, a flexible film strip in the form of an endless belt freely supported thereon for movement into and out of surface contact therewith, a flexible web of sensitized material overlying a portion of the film strip on the cylinder, tensioning means cooperating with the web, and transmitting means effective upon a portion of the web out of contact with the film strip, said transmitting and tensioning means being effective to tension the web longitudinally and press it upon the film strip to move the portions of the latter into and out of surface contact with the cylinder.

15. In an apparatus of the class described, the combination of a film supporting member formed to permit passage of light, a flexible film strip having surface contact with one side thereof and movable past the same, a luminant disposed on the opposite side of the supporting member, a diaphragm cooperating with the luminant to determine the area of effectiveness of the same upon the supporting member, a flexible web of sensitized material overlying a portion of the film strip in contact with the supporting member, and feeding means engaging the web at a point out of contact with the film strip, said feeding means being effective through the web to transmit both the web and film strip past the supporting member.

16. In a machine of the class described, the combination of a rotatable cylinder formed to permit passage of light, a luminant supported therein, a photographic film in the form of a loop encircling the cylinder and having surface contact therewith throughout a fraction of the length of the film, a flexible web of sensitized material overlying a portion of the film in contact with the cylinder, rollers engaging said web at points ahead of and past the cylinder, and means for actuating one or more of said rollers to transmit the web and thereby transmit the film and rotate the cylinder.

17. In a machine of the class described, the combination of a film supporting member formed to permit passage of light, a luminant supported at one side thereof, a diaphragm member enclosing the luminant and affording an exposure aperture, a mounting for the supporting member arranged to permit insertion thereof through an endless flexible film belt, and means for transmitting a flexible web in contact with said film belt across the side of the supporting member opposite the luminant.

18. In an apparatus of the class described, the combination of means for effecting continuous longitudinal feed of a flexible web, a frame, a luminant supported on the frame, a diaphragm member for controlling the area of effectiveness of the luminant, a film supporting member demountably supported on the frame in position to sustain a portion of the web transmitted by the feeding mechanism, said supporting member having a portion disposed between the luminant and such web, and a photographic film in the form of a loop encircling the supporting member and movable into and out of contact with the same, said film having a portion disposed between the luminant and the web.

19. In a machine of the class described, the combination of a rotatable cylinder, a photographic film in the form of a loop encircling the cylinder and movable into and out of contact therewith, a luminant arranged to direct light upon a portion of the film in contact with the cylinder, and rollers disposed on opposite sides of the cylinder for transmitting a flexible web across the same in contact with the film whereby to transmit the film and rotate the cylinder.

20. A machine for photographic printing comprising a rotatably supported cylinder of light transmitting material, a flexible film belt movably supported on the cylinder and adapted to move over the surface of said cylinder as the cylinder is rotated, a luminant within the cylinder, and means for transmitting a web of sensitizing material around a portion of the cylinder over the film, whereby the cylinder is rotated and the film is transmitted progressively and repeatedly past the luminant.

21. In a machine for photographic printing, the combination of a frame, an open-ended cylinder of light transmitting material rotatably supported thereon, a luminant supported on the frame and disposed within the cylinder, said luminant and cylinder being associated for relative longitudinal movement whereby the luminant may be removed from the cylinder, a diaphragm associated with the luminant to control its effectiveness on the cylinder, and a film strip and a sensitized web supported on the cylinder for transmission past the luminant.

22. In a machine for photographic printing, the combination of a frame, a cylinder of light transmitting material rotatably supported thereon, a lamp support shiftably mounted on the frame, a lamp carried by said lamp support and movable by the shifting thereof into and out of the cylinder, and means for feeding a film strip and sensitized web about part of the cylinder.

23. A machine for photographic printing comprising a rotatably supported cylinder of light transmitting material, a flexible endless belt film looped about said cylinder and movably supported thereon, said belt being adapted to move over the surface of said cylinder as the cylinder is rotated, a luminant within the cylinder, and means for transmitting a web of sensitized material over the cylinder and film whereby the cylinder is rotated and the film is transmitted progressively and repeatedly past the luminant.

24. A machine for photographic printing comprising a rotatably supported cylinder of light transmitting material, a flexible endless belt film movably supported on said cylinder and being in contact therewith for only a portion of its length, said film being adapted to move progressively over the surface of the cylinder as the cylinder is rotated, a luminant within the cylinder, a web of sensitized material passed over the cylinder in contact with said film, and means for moving said film whereby rotation is imparted to said cylinder and the web is moved progressively over succeeding portions of said film as said portions are moved into engagement with said cylinder.

25. A machine for photographic printing comprising a light transmitting support, an endless flexible film belt supported by said support, said belt being adapted to move over said support whereby succeeding portions of said belt are presented progressively and repeatedly to said support, and a web of sensitized material overlying said support and maintained in frictional engagement with said belt, said web being adapted to be moved whereby said film belt is caused to so move over said support as to present succeeding portions of the web to the support progressively and repeatedly.

26. A machine for photographic printing comprising a light transmitting support, an endless flexible film belt supported by said support, said belt being adapted to move over said support, a web of sensitized material overlying said support and maintained in frictional engagement with said film belt and means for moving said web over said belt whereby said belt is caused to move progressively and repeatedly over said support.

27. A machine for photographic printing comprising a light transmitting support, an endless flexible film belt supported by said support, said belt being adapted to move over said support, a web of sensitized material overlying said support and maintained in frictional engagement with said film belt, means for moving said web over said belt whereby said belt is caused to move progressively and repeatedly over said support, and tension means for maintaining said web in frictional contact with said belt as the belt is moved progressively and repeatedly over said support.

Signed at Chicago, Illinois, this 12th day of November, 1920.

DAVID G. URQUHART.